United States Patent
Myers

(10) Patent No.: US 11,509,670 B2
(45) Date of Patent: Nov. 22, 2022

(54) DETECTING ANOMALOUS NETWORK ACTIVITY

(71) Applicant: Rapid7, Inc., Boston, MA (US)

(72) Inventor: Dustin Myers, Alexandria, VA (US)

(73) Assignee: Rapid7, Inc., Boston, MA (US)

( * ) Notice: Subject to any disclaimer, the term of this patent is extended or adjusted under 35 U.S.C. 154(b) by 241 days.

(21) Appl. No.: 16/202,217

(22) Filed: Nov. 28, 2018

(65) Prior Publication Data

US 2020/0169575 A1 May 28, 2020

(51) Int. Cl.
*H04L 9/40* (2022.01)
*G06F 17/11* (2006.01)

(52) U.S. Cl.
CPC .......... *H04L 63/1425* (2013.01); *G06F 17/11* (2013.01)

(58) Field of Classification Search
None
See application file for complete search history.

(56) References Cited

U.S. PATENT DOCUMENTS

| | | | |
|---|---|---|---|
| 7,860,006 B1 * | 12/2010 | Kashyap | H04L 63/1416 702/182 |
| 8,881,282 B1 * | 11/2014 | Aziz | G06F 21/554 726/24 |
| 2006/0190998 A1 * | 8/2006 | Aiello | H04L 63/029 726/11 |
| 2013/0097706 A1 * | 4/2013 | Titonis | G06F 21/566 726/22 |
| 2016/0241576 A1 * | 8/2016 | Rathod | H04L 63/1425 |
| 2019/0026466 A1 * | 1/2019 | Krasser | G06N 20/20 |

OTHER PUBLICATIONS

Killourhy et al., Comparing Anomaly-Detection Algorithms for Keystroke Dynamics, In 2009 IEEE/IFIP International Conference on Dependable Systems & Networks (pp. 125-134). (Year: 2009).*
Ferragut et al., "A new, principled approach to anomaly detection." In 2012 11th International Conference on Machine Learning and Applications, vol. 2, pp. 210-215. (Year: 2012).*

* cited by examiner

*Primary Examiner* — Luu T Pham
*Assistant Examiner* — Edward X Long
(74) *Attorney, Agent, or Firm* — Ashwin Anand

(57) ABSTRACT

Methods and systems for detecting anomalous network activity. The system may receive network metadata regarding activity on a network and generate at least one of a z-score and a directionality magnitude related to the network activity. The system may then issue an alert upon detecting an anomaly exists on the network based upon at least one of the generated z-score exceeding a z-score threshold and the generated directionality magnitude deviating from a baseline directionality magnitude.

13 Claims, 5 Drawing Sheets

DETECTING ANOMALOUS NETWORK ACTIVITY

TECHNICAL FIELD

Embodiments described herein generally relate to systems and methods for detecting anomalous activity on a network.

BACKGROUND

Due to their prevalence in today's society, the internet and other types of networks have become a hub for criminal activity. Often times cyber-criminals or other threat actors attempt to install or otherwise deploy harmful applications on unprotected systems. Once a threat actor obtains access to a targeted system or device, they may perform further actions such as stealing data, escalating their privileges, or the like.

Certain activity on a network may be indicative that a threat actor is, for example, profiling the network, profiling devices on the network, transferring data to/from network devices, installing harmful applications on network devices, or the like. For example, a high amount of network traffic may indicate an attack. Or, although not necessarily indicative of a threat, some network devices may exhibit behavior that nonetheless warrants further investigation.

Existing techniques for detecting this type of activity often result in false positives. False positives may not only annoy security personnel, but also distract them and divert computing resources from addressing actual malicious network activity.

A need exists, therefore, for systems and methods for detecting anomalous network activity that overcome the disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for detecting anomalous activity on a network. The method includes receiving, using an interface, network metadata regarding a host device on the network; generating, using a processor executing instructions stored on a memory, at least one of a z-score related to the network metadata and a directionality magnitude related to the network metadata; detecting, using the processor, that an anomaly exists on the network based upon at least one of the generated z-score exceeding a z-score threshold and the generated directionality magnitude deviating from a baseline directionality magnitude; and issuing, using the processor, an alert upon detecting the anomaly exists.

In some embodiments, the received network metadata includes a count of bytes sent from the host device and a count of bytes received by the host device, and the generated directionality magnitude is based on the count of bytes sent from the host device and the count of bytes received by the host device.

In some embodiments, the network metadata includes at least one feature selected from the group consisting of time of a connection, type of connection, connection duration, and byte count. In some embodiments, the method further includes detecting the anomaly upon determining a plurality of the features deviate from a feature baseline. In some embodiments, the method further includes detecting the anomaly upon determining a number of features deviating from feature baselines exceed a feature threshold. In some embodiments, the method further includes suppressing an alert upon determining a number of features deviating from feature baselines is below a feature threshold.

In some embodiments, the z-score is a directionality magnitude z-score.

In some embodiments, generating the z-score includes performing a logarithmic transformation on the network metadata.

According to another aspect, embodiments relate to a system for detecting anomalous activity on a network. The system includes an interface for receiving network metadata regarding a host device on the network; and a processor executing instructions stored on a memory to generate at least one of a z-score related to the network metadata and a directionality magnitude related to the network metadata, detect that an anomaly exists on the network based upon at least one of the generated z-score exceeding a z-score threshold and the generated directionality magnitude deviating from a baseline directionality magnitude, and issue an alert upon detecting the anomaly exists.

In some embodiments, the received network metadata includes a count of bytes sent from the host device and a count of bytes received by the host device, and the generated directionality magnitude is based on the count of bytes sent from the host device and the count of bytes received by the host device.

In some embodiments, the network metadata includes at least one feature selected from the group consisting of time of a connection, type of connection, connection duration, and byte count. In some embodiments, the processor detects the anomaly upon determining a plurality of the features deviate from a feature baseline. In some embodiments, the processor detects the anomaly upon determining a number of features deviating from feature baselines exceed a feature threshold. In some embodiments, the processor is further configured to suppress an alert upon determining a number of features deviating from feature baselines is below a feature threshold.

In some embodiments, the z-score is a directionality magnitude z-score.

In some embodiments, the processor generates the z-score by performing a logarithmic transformation on the network metadata.

According to yet another aspect, embodiments relate to a method for detecting anomalous activity on a network. The method includes receiving, using an interface, network metadata regarding activity on the network, the network metadata including a count of bytes sent from a host device and a count of bytes received by the host device; generating, using a processor executing instructions stored on a memory, a directionality magnitude based on the count of bytes sent from the host device and the count of bytes received by the host device; retrieving a baseline directionality magnitude value from a database; and issuing an alert using a user interface upon the processor determining the generated directionality magnitude deviates from the baseline directionality magnitude value.

BRIEF DESCRIPTION OF DRAWINGS

Non-limiting and non-exhaustive embodiments of this disclosure are described with reference to the following

DETAILED DESCRIPTION

Figure 1:
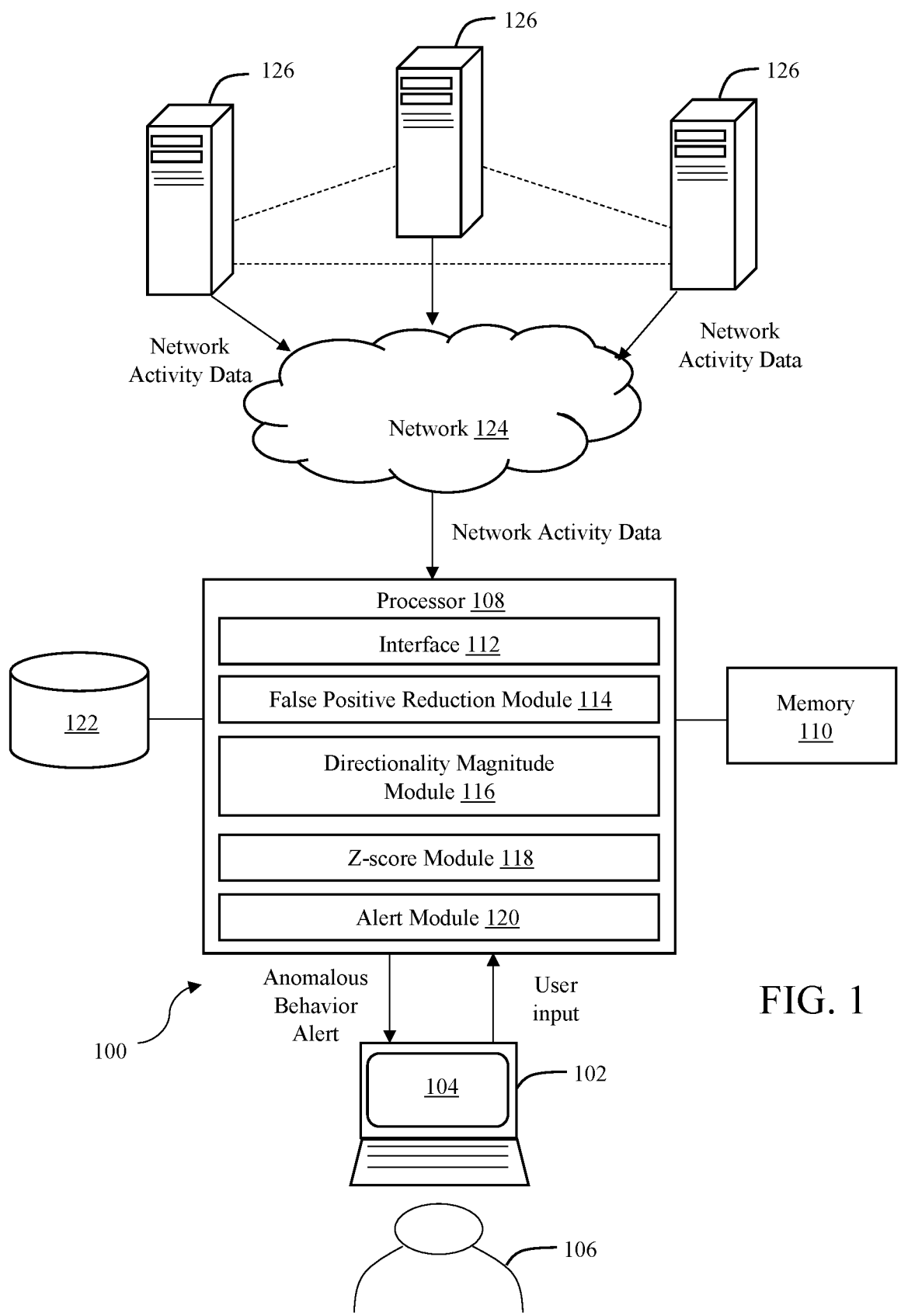
FIG. 1 illustrates a system for detecting anomalous activity on a network in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The systems and methods described herein provide novel techniques for detecting anomalous or otherwise unusual activity on a network. This activity may include malicious activity undertaken by one or more threat actors. Or, certain behavior on a network may not necessarily be harmful or indicative of a threat, but may nonetheless be unusual based on past network behavior.

The systems and methods described herein may consider baseline or otherwise past network behavior to detect this anomalous activity. By comparing current network activity against this baseline behavior, the systems and methods described herein can determine whether or not network activity is anomalous.

FIG. 1 illustrates a system 100 for detecting anomalous activity on a network in accordance with one embodiment. The system 100 may include a user device 102 executing a user interface 104 accessible by a user 106. The user interface 104 may allow a user 106 such as security personnel to view data regarding activity on a network, and may also issue alerts to the user 106 indicating anomalous activity on the network. The user 106 may then review any data associated with the alert (e.g., the data that caused the alert to be issued).

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to the user 106.

The user device 102 may be in operable communication with one or more processors 108. The processor(s) 108 may be any hardware device capable of executing instructions stored on memory 110 to detect anomalous network activity to accomplish the objectives of various embodiments described herein. The processor 108 may be a microprocessor, a field programmable gate array (FPGA), an application-specific integrated circuit (ASIC), or other similar device whether available now or invented hereafter.

In some embodiments, such as those relying on one or more ASICs, the functionality described as being provided in part via software may instead be configured into the design of the ASICs and, as such, the associated software may be omitted. The processor(s) 108 may be configured as part of the user device 102 on which the user interface 104 executes, such as a laptop, or may be located at some remote location.

The processor 108 may execute instructions stored on memory 110 to provide various modules that can analyze network activity to detect anomalous activity. Specifically, the processor 108 may execute or otherwise include an interface 112, a false positive reduction module 114, a directionality magnitude module 116, a z-score module 118, and an alert module 120.

The memory 110 may be L1, L2, L3 cache or RAM memory configurations. The memory 110 may include non-volatile memory such as flash memory, EPROM, EEPROM, ROM, and PROM, or volatile memory such as static or dynamic RAM, as discussed above. The exact configuration/type of memory 110 may of course vary as long as instructions for detecting anomalous network activity can be executed by the processor 108 to accomplish the features of various embodiments described herein.

The processor 108 may be in further operable communication with one or more databases 122. The database(s) 122 may store data accessible by the processor 108 to assist in detecting anomalous activity. For example, the database(s) 122 may store data related to baseline behavior of devices on the network. This may include, for example, and without limitation, one or more of average connection durations for network devices, the average amount of data exchanged in a given connection, services offered by the devices, ports the devices use to communicate, or the like.

The processor 108 may execute instructions stored on memory 110 and rely on data stored in the database(s) 122 to detect anomalous activity on one or more networks 124 that include one or more devices 126. The network(s) 124 may link the various devices with various types of network connections. The network(s) 124 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 124 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The network devices 126 may comprise any devices that receive and/or transmit data over the network(s) 124. These devices 126 may include servers, computers, telephones, printers, scanners, mobile devices, etc. The devices 126 used in conjunction with the features of the various embodiments described herein may vary and may depend on the application.

In operation, the interface 112 may receive data representative of activity on the network(s) 124. The system 100 may gather this network activity using any suitable passive or active techniques.

Figure 2:
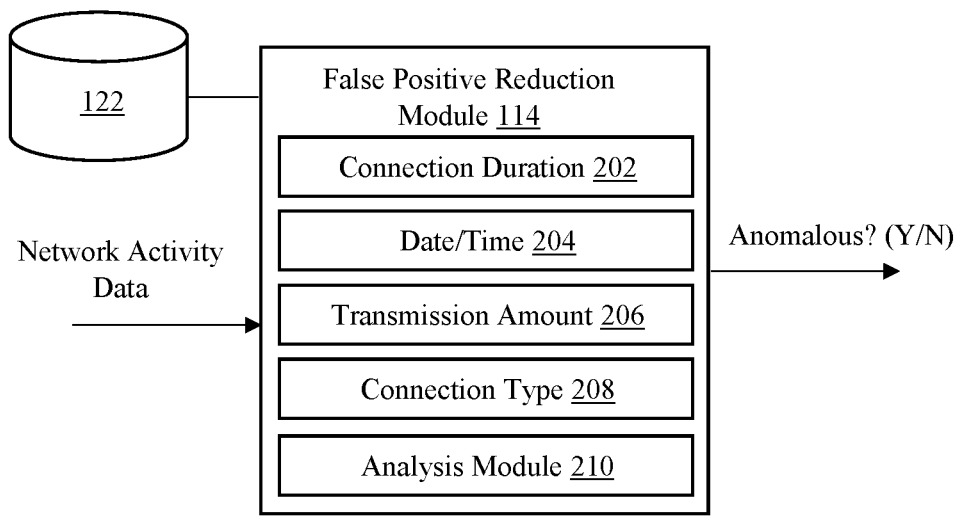
FIG. 2 illustrates the false positive reduction module of FIG. 1 in accordance with one embodiment.

The false positive reduction module 114 may consider a plurality of features that together help reduce false positives. FIG. 2 illustrates the false positive reduction module 114 in accordance with one embodiment. In this embodiment, the false positive reduction module 114 may be configured to execute a connection duration module 202, a date/time module 204, a transmission amount module 206, a connection type module 208, and an analysis module 210.

The connection duration module 202 may analyze or otherwise consider the duration of connections between network devices. For example, usually long connection durations may suggest anomalous behavior, particularly with respect data to the baseline data regarding non-anomalous connections stored in the one or more databases 122.

The date/time module 204 may analyze or otherwise consider the date and/or time of connections between network devices. For example, certain network devices may generally only initiate connections and send/receive data during weekdays during the day. Accordingly, the date/time module 204 may classify connections that occur early in the morning on weekends as at least potentially anomalous. Data regarding the expected or otherwise non-anomalous dates/times for connections may be stored in the one or more databases 122.

The transmission amount module 206 may analyze or otherwise consider the amount of data that is transmitted (sent and/or received) by one or more devices. For example, a connection in which the amount of data sent is above a certain threshold may suggest anomalous activity. Data regarding the expected or otherwise non-anomalous amounts of transmitted data may be stored in the one or more databases 122.

The connection type module 208 may analyze or otherwise consider the type of connection(s) occurring on a network. For example, some devices may generally be involved in web traffic connections as opposed to database connections. Data regarding the expected or otherwise non-anomalous connections associated with one or more particular devices may be stored in the one or more databases 122.

The analysis module 210 may be configured to analyze the output of one or more of the modules 202-08 of the false positive reduction module 114 to more accurately determine whether network activity is anomalous. By considering multiple features, the analysis module 210 (and therefore the false positive reduction module 114) can more accurately predict that certain network activity is anomalous and thereby reduce false positives. The various modules 202-08 are merely exemplary, and other types of data in addition to or in lieu of the data described above may be considered to accomplish the features of the various embodiments described herein.

The analysis module 210 may analyze the output of one or more of the various modules 202-08 in a variety of ways. For example, the analysis module 210 may output a decision that the network activity data is anomalous only if two or more of the modules 202-08 provide a "vote" that its associated data indicates the network activity is anomalous.

The sensitivity of the analysis module 210 may be adjusted and may depend on the application as well. For example, some applications may be less sensitive and require all four modules 202-08 of the false positive reduction module 114 to output an anomalous vote before the analysis module 210 determines the network activity data is anomalous. Other, more sensitive applications may require only two of the modules 202-08 to output an anomalous vote before the analysis module 210 determines the network activity data is anomalous.

In some embodiments, a stronger showing of one or more data types/features may make up for a lesser showing of one or more data types. For example, the date/time of a connection may be only slightly after normal hours for a particular device such that the date/time module 204 itself would not call the connection anomalous. However, the transmission amount may be extremely high such that the analysis module 210 may ultimately decide the combination of the different types of data suggest the activity is anomalous.

Referring back to FIG. 1, the directionality magnitude module 116 may calculate a metric herein referred to as "directionality magnitude." The directionality magnitude considers the bytes sent from a particular network device and the bytes received by the network device. The directionality magnitude is essentially a ratio of the amount of bytes sent to the amount of bytes received (or vice versa). The directionality magnitude may also include a sign (positive or negative) to express the direction of the relationship.

The "bytes sent" is a count of the bytes that a source device sent and "bytes received" is a count of the bytes sent by the destination device (and subsequently received by the source device). The magnitude value is a comparison of these two values. The closer to zero this value is, the more equal the number of sent bytes is to the number of received bytes. For example, if the number of sent bytes is one hundred (100) and the number of received bytes is also one hundred (100), then the magnitude would be zero.

The "directionality" aspect refers to the direction of the magnitude (e.g., positive or negative). For example, when the source device sends less data than it receives, the directionality sign would be positive. If the source device sends more data than it receives, then the sign would be negative. In other words, a positive directionality can be thought of as the source device "gaining" data, and a negative directionality can be thought of as the source device "losing" data.

The directionality magnitude module 116 can calculate the directionality magnitude using the following formula:

$$((\text{MAX}(src\text{bytes}, dst\text{bytes}) \div \text{MIN}(src\text{bytes}, dst\text{bytes})) - 1) \times \text{IF}(src\text{bytes} < dst\text{byte}, 1, -1)$$

Figure 3A:
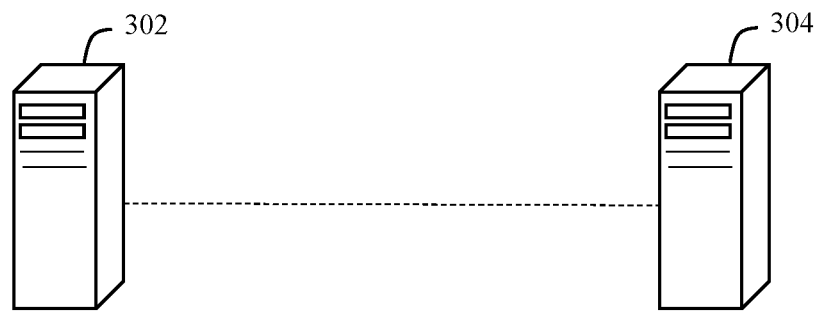
FIGS. 3A-C illustrate a source device sending data to and receiving data from a destination device in accordance with one embodiment.
Figure 3B:
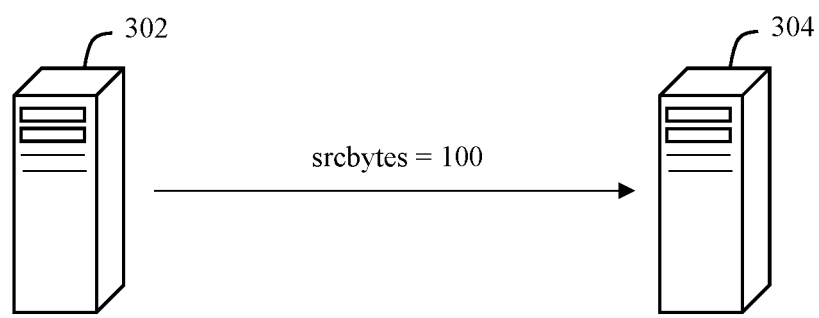
Figure 3C:
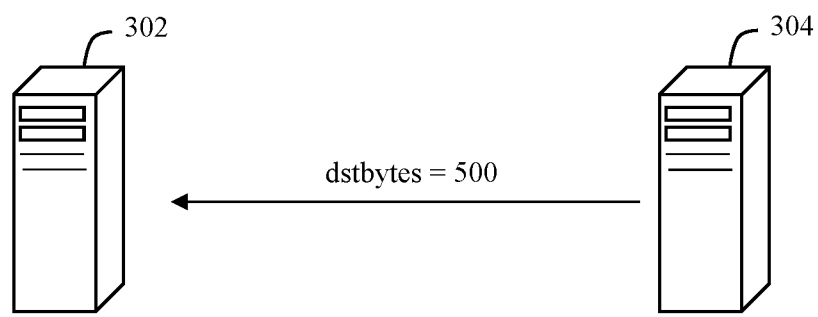

FIG. 3A illustrates a source device 302 associated with a source address in operable communication with a destination device 304 associated with a destination address. FIG. 3B illustrates the source device 302 sending 100 bytes (srcbytes=100) to the destination device 304. FIG. 3C illustrates the destination device 304 sending 500 bytes (dstbytes=500) to the source device 302.

In the scenario illustrated in FIGS. 3A-C, the directionality magnitude module 116 may use the above formula to calculate the directionality magnitude as follows:

$$((\text{MAX}(100, 500) \div \text{MIN}(100, 500)) - 1) \times \text{IF}(100 < 500, 1, -1)$$

$$((500 \div 100) - 1) \times 1$$

$$(5-1) \times 1 = 4$$

Accordingly, the destination device 304 sent four times more bytes than the source device 302 sent.

As another example, if srcbytes=1,000 and dstbytes=300, the directionality magnitude can be calculated as $$((\text{MAX}(1000, 300) \div \text{MIN}(1000, 300)) - 1) \times \text{IF}(1000 < 300, 1, -1)$$

$$((1000 \div 300) - 1) \times -1$$

$$(3.33 - 1) \times -1$$

$$-2.33$$

Accordingly, the source device 302 in this case sent 2.33 times as many bytes as it received. As discussed previously, the negative sign represents the fact that the source device 302 sent more data (1,000 bytes) than it received (300 bytes).

Relatively high directionality magnitudes can indicate an attack or otherwise malicious activity is occurring on the network. For example, the normal operation of a network device may involve the network device sending out a query for certain images through a search engine. This query may be represented as only a small amount of data, particularly with respect to the amount data that will be returned to the network device (e.g., hundreds of images). This exchange would result in a positive directionality magnitude.

During an attack or otherwise during events associated with malicious activity, a large amount of data may be sent from a device compared with the amount of data coming in to the device. For example, a large negative directionality magnitude may indicate a threat actor has obtained access to a network device and is exfiltrating data therefrom.

Referring back to FIG. 1, the z-score module 118 may calculate a z-score regarding one or more features related to network activity. The z-score compares a subset of data related to network activity against an established baseline (based on previous network activity) to identify outliers.

An advantage of using the z-score to identify anomalous network activity is that the tolerances can flex based on the established baseline. In other words, if the baseline of behavior is highly uniform, then the tolerance level used to identify outliers will be tighter. On the other hand, if the baseline behavior for a particular feature encompasses a wider range or variety of values, the tolerances will be wider (i.e., a network event would need to be more "extreme" to be classified as anomalous).

The z-score module 118 may calculate the z-score for a particular feature by subtracting the baseline mean (i.e., simple average) from an individual connection or activity of interest, and then divide that value by the standard deviation of the baseline. Or, in some embodiments, the z-score module 118 may subtract the baseline mean from a time series interval and then divide by the standard deviation of the baseline.

In other words, the z-score is the number of standard deviations away from the mean a received network activity data value is. For example, a mean byte count associated with a host device's transmissions may be 1,000, and the standard deviation may be 50. If this host device is involved in a connection that has a byte count of 2,500, then the z-score can be calculated as (2,500−1,000)/50=30. If the minimum or otherwise z-score threshold value for which the z-score module 118 classifies activity as anomalous is 5 (and 30>5), then the z-score module 118 may conclude this activity is anomalous.

For data values corresponding to certain network activity, it may be helpful for the z-score module 118 to transform the data into a certain form to calculate a more meaningful z-score. For example, in some embodiments, the z-score module 118 may perform the z-score calculation by first performing a logarithmic transformation on the network metadata (e.g., by using the natural log of the metadata). This may be particularly useful when analyzing network features such as byte counts and/or connection durations.

As another example, certain network activity data may be prohibitively small (e.g., less than one) such that the z-score module 118 would be unable to calculate a meaningful z-score. This may occur with network activity data related to connection durations, for example. In these cases, the z-score module 118 may perform some operation on the data, such as adding one (+1) to the data value(s) before determining the natural log thereof.

The alert module 120 may receive and consider output from one or more of the false positive reduction module 114, the directionality magnitude module 116, and the z-score module 118 to determine whether or not to issue an alert. For example, if the analysis associated with two or more of the modules 114, 116, and 118 determines that network activity is anomalous, the alert module 120 may issue an alert to the user 106 via the user interface 104 to inform the user 106 of the anomalous activity. The alert may be a visual-based alert, a text-based alert, an audio-based alert, a haptic-based alert, or some combination thereof.

In some embodiments, the alert module 120 may issue an alert only if all three modules 114, 116, and 118 indicate their associated analyses suggest network activity is anomalous. Or, in some embodiments, the alert module 120 may issue an alert if the directionality magnitude module 116 and/or the z-score module 118 indicate that network activity is anomalous.

Figure 4:
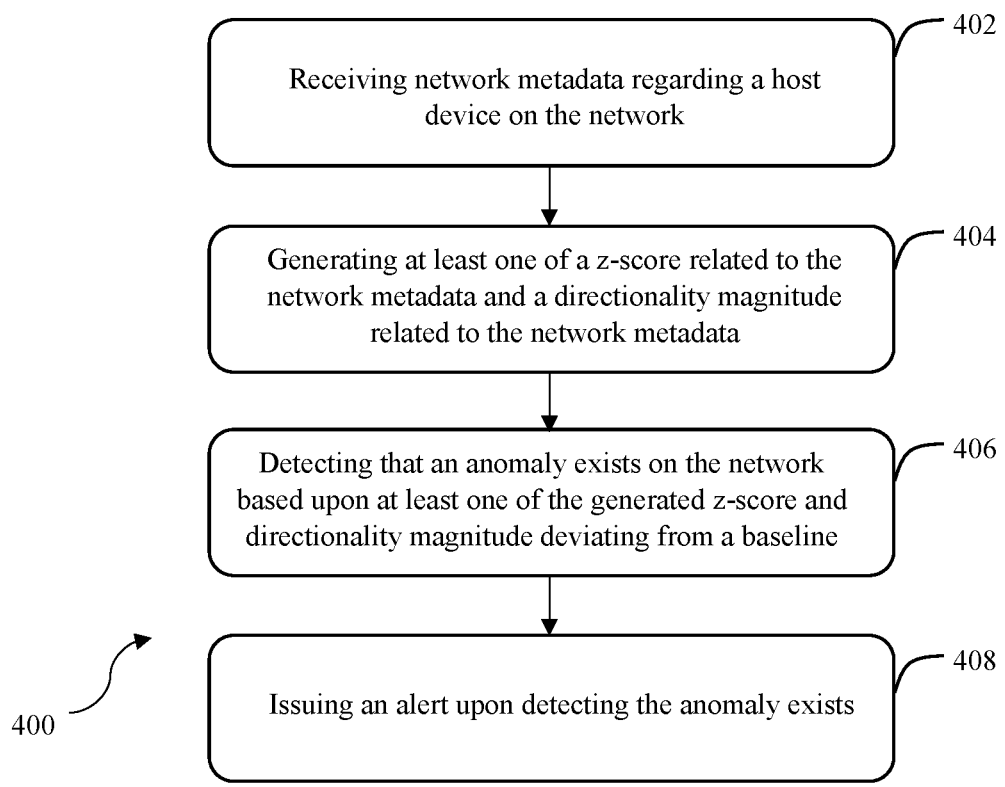
FIG. 4 depicts a flowchart of a method for detecting anomalous activity on a network in accordance with one embodiment.

FIG. 4 depicts a flowchart of a method 400 for detecting anomalous activity on a network in accordance with one embodiment. Step 402 involves receiving, using an interface, network metadata regarding a host device on the network. The received network metadata may include a count of bytes sent from the host device and/or a count of bytes received by the host device. Additionally or alternatively, the network metadata may include one or more features such as the time of a connection, the type of connection, the connection duration, and byte count.

Step 404 involves generating, using a processor executing instructions stored on a memory, at least one of a z-score related to the network metadata and a directionality magnitude related to the network metadata. As discussed previously, the directionality magnitude may serve as a ratio of the bytes sent to bytes received by a particular host device. The direction of the data transmission may be indicated by a positive or negative sign that represents the overall direction of the data transmission (i.e., whether more data is going to the host device or going out from the host device). The magnitude essentially compares the bytes sent and the bytes received.

Network activity that shows a relatively high amount of data being sent out from a host device compared to the amount of data received by the host device may indicate anomalous activity. For example, this may indicate that a threat actor has obtained access to the host device and is exfiltrating data from the host device for any one of a variety of malicious purposes. For example, if the sent data relates to personal or financial information, the malicious actor may then try to sell the data to other malicious actors.

As discussed previously, the z-score module 118 may calculate a z-score for any one or more features related to network activity. For example, in some embodiments, the z-score module 118 may calculate a z-score of the directionality magnitude.

Step 406 involves detecting, using the processor, that an anomaly exists on the network based upon at least one of the generated z-score exceeding a z-score threshold and the generated directionality magnitude deviating from a baseline directionality magnitude. For example, the directionality magnitude may be compared to a baseline stored in one or more databases 122. The database(s) 122 may store data regarding previous behavior of one or more host devices, such as their average directionality magnitude over a time period or at specific time periods. These averages may be simple averages or weighted averages, for example.

As discussed above, features such as the time of the connection, the connection duration, and byte count may be considered as well. Deviations of these features from respective baselines may also be used in determining whether network activity is anomalous.

The amount that a value may deviate from a baseline before it is considered anomalous may vary and may depend on the application and/or type of host device. For example, host devices on financial-related networks may be configured with lower tolerances such that even slight deviations from a baseline may qualify as an anomaly.

Step 408 involves issuing, using the processor, an alert upon detecting the anomaly exists. As discussed previously, the alert may be a visual-based alert, a text-based alert, an audio-based alert, a haptic-based alert, or some combination thereof. A user such as security personnel may then view data associated with the alert (i.e., the anomalous activity) and take any appropriate steps. Additionally or alternatively, the system 100 of FIG. 1 may be configured to autonomously take any necessary steps to investigate or otherwise mitigate the anomalous activity.

In some embodiments, however, an alert module may require that a certain number of features indicate that activity is anomalous (e.g., a number of features above a threshold). If not enough features or modules indicate anomalous activity, an alert module such as the alert module 120 of FIG. 1 may be configured to suppress an alert.

Figure 5:
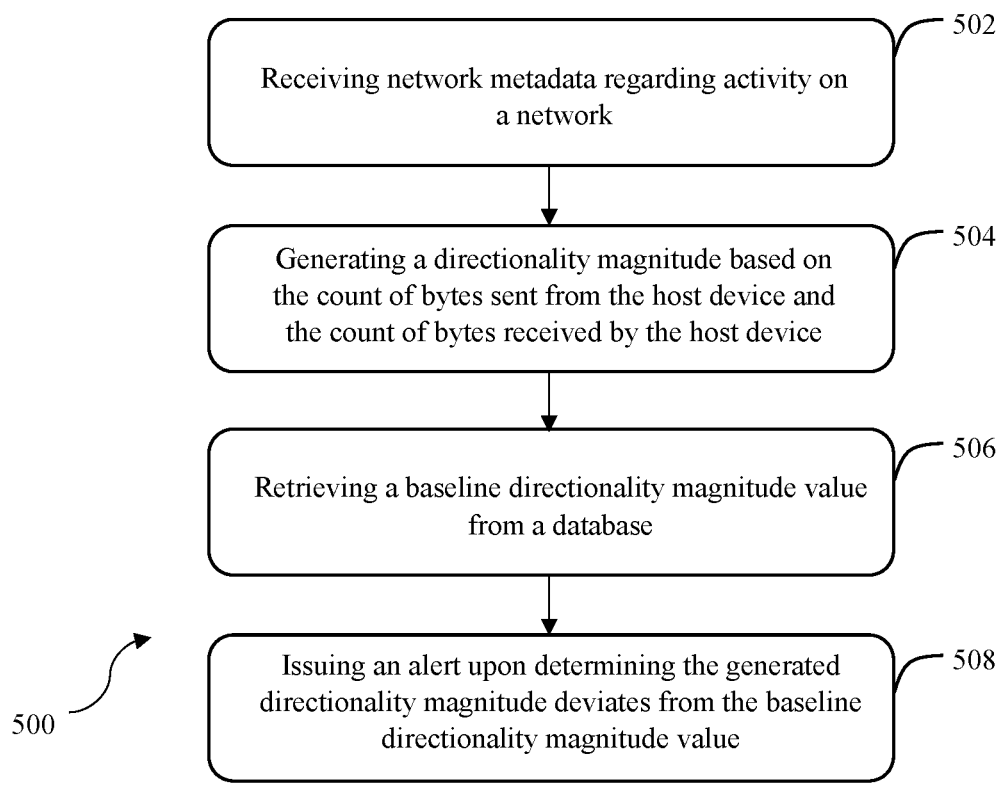
FIG. 5 depicts a flowchart of a method for detecting anomalous activity on a network in accordance with another embodiment.

FIG. 5 depicts a flowchart of a method 500 for detecting anomalous activity on a network in accordance with one embodiment. Step 502 involves receiving, using an interface, network metadata regarding activity on a network. This network metadata includes a count of bytes sent from a host device and a count of bytes received by the host device. The network metadata may include additional network activity data as well.

Step 504 involves generating, using a processor executing instructions stored on a memory, a directionality magnitude based on the count of bytes sent from the host device and the count of bytes received by the host device.

Step 506 involves retrieving a baseline directionality magnitude value from a database. The baseline directionality magnitude value may relate to previous behavior of a device and may be used to determine expected/non-anomalous behavior of the host device. For example, one or more databases such as the databases 122 of FIG. 1 may store data regarding average directionality magnitudes for a particular time or day of the week.

Step 508 involves issuing an alert using a user interface upon the processor determining the generated directionality magnitude deviates from the baseline directionality magnitude value. Minor deviations are expected and therefore may not give rise to an alert. In some embodiments, the processor (e.g., the alert module 120) may be configured to issue an alert only if the generated directionality magnitude deviates from the baseline value by more than some threshold. For example, if the generated directionality magnitude is more than ±10% from the baseline directionality magnitude value, an alert module such as the alert module 120 may issue an alert to a user informing the user of the deviation.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method comprising:
  performing, by a computing system implemented by one or more processors configured to execute instructions stored on a memory:
    receiving network metadata of a network comprising:
      a number of bytes sent from a host device in the network, and
      a number of bytes sent to the host device;
    calculating a directionality magnitude based on a ratio between the number of bytes sent from the host device and the number of bytes received by the host device, wherein the directionality magnitude is positive or negative depending on whether more bytes are sent or received by the host device;
    generating a z-score based on the network metadata and previously received network metadata that was received before the network metadata, wherein generating the z-score includes performing a logarithmic transformation on the network metadata;
    detecting that an anomaly exists on the network based at least on the z-score exceeding a z-score threshold and the directionality magnitude deviating from a baseline directionality magnitude; and
    performing at least one mitigation procedure to mitigate the anomaly upon detecting that the anomaly exists.

2. The method of claim 1, wherein the network metadata includes at least one feature of a connection, wherein the at least one feature comprises at least one of a time of the connection, a type of the connection, a connection duration, or a connection byte count.

3. The method of claim 2, further comprising the computing system:
  detecting that the anomaly exists upon determining that a plurality of features deviate from a feature baseline.

4. The method of claim 3, further comprising the computing system:

detecting that the anomaly exists upon determining that a number of the at least one feature deviating from feature baselines exceed a feature threshold.

5. The method of claim 2, further comprising the computing system:
suppressing an alert upon determining that a number of the at least one feature deviating from feature baselines is below a feature threshold.

6. The method of claim 1, wherein the z-score is a directionality magnitude z-score.

7. A system comprising:
a computing system implemented by one or more processors and a memory that stores instructions executable by the one or more processors to:
receive, via an interface of the computing system, network metadata of a network including:
a number of bytes sent from a host device in the network, and
a number of bytes sent to the host device;
calculate a directionality magnitude based on a ratio between the number of bytes sent from the host device and the number of bytes received by the host device, wherein the directionality magnitude is positive or negative depending on whether more bytes are sent or received by the host device;
generate a z-score based on the network metadata and previously received network metadata that was received before the network metadata, wherein the generation of the z-score includes performing a logarithmic transformation on the network metadata;
detect that an anomaly exists on the network based at least on the z-score exceeding a z-score threshold and the directionality magnitude deviating from a baseline directionality magnitude; and
perform at least one mitigation procedure to mitigate the anomaly upon detecting that the anomaly exists.

8. The system of claim 7, wherein the network metadata includes at least one feature of a connection, wherein the at least one feature comprises at least one of a time of the connection, a type of the connection, a connection duration, or a connection byte count.

9. The system of claim 8, wherein the computing system is configured to detect that the anomaly exists upon determining that a plurality of features deviate from a feature baseline.

10. The system of claim 9, wherein the computing system is configured to detect that the anomaly exists upon determining that a number of the at least one feature deviating from feature baselines exceed a feature threshold.

11. The system of claim 8, wherein the computing system is configured to is configured to suppress an alert upon determining that a number of the at least one feature deviating from feature baselines is below a feature threshold.

12. The system of claim 7, wherein the z-score is a directionality magnitude z-score.

13. A method comprising:
performing, by a computing system implemented by one or more processors configured to execute instructions stored on a memory:
receiving, using an interface of the computing system, network metadata regarding activity on a network, the network metadata including:
a count of bytes sent from a host device in the network, and
a count of bytes received by the host device;
calculating a directionality magnitude based on a ratio between the number of bytes sent from the host device and the number of bytes received by the host device, wherein the directionality magnitude is positive or negative depending on whether more bytes are sent or received by the host device;
generating a z-score based on the network metadata and previously received network metadata that was received before the network metadata, wherein generating the z-score includes performing a logarithmic transformation on the network metadata;
retrieving a baseline directionality magnitude value from a database, wherein the baseline directionality magnitude value is based on previous behavior of the host device;
determining that an anomaly exists on the network based at least on the z-score exceeding a z-score threshold and the directionality magnitude deviating from the baseline directionality magnitude value; and
performing at least one mitigation procedure upon determining that the anomaly exists on the network.

* * * * *